UNITED STATES PATENT OFFICE.

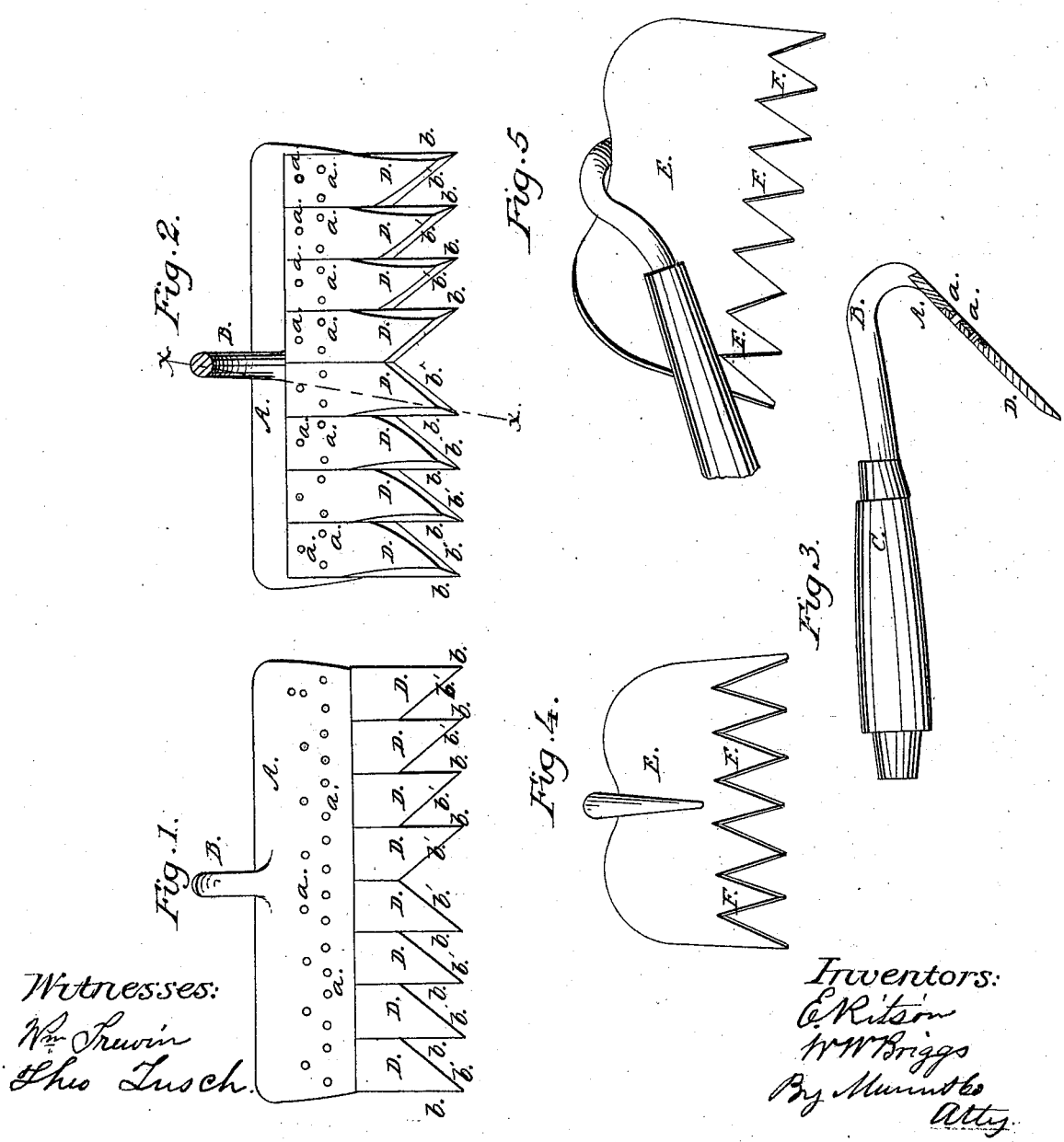

EDWIN RITSON AND WILLIAM W. BRIGG, OF MATTAVILLE, NEW YORK.

IMPROVEMENT IN HOES.

Specification forming part of Letters Patent No. 55,365, dated June 5, 1866.

*To all whom it may concern:*

Be it known that we, EDWIN RITSON and WILLIAM W. BRIGG, of Mattaville, in the county of Saratoga and State of New York, have invented a new and Improved Hoe; and we do hereby declare that the following is a full, clear, and exact description thereof, which will enable those skilled in the art to make and use the same, reference being had to the accompanying drawings, forming part of this specification, in which—

Figure 1 represents an outer face view of our invention; Fig. 2, an inner face view of the same; Fig. 3, a section of the same, taken in the line $x\ x$, Fig. 2; Fig. 4, an outer face view of a modification of the same; Fig. 5, a perspective view of Fig. 4.

Similar letters of reference indicate corresponding parts.

This invention relates to an improvement in that class of hoes which are provided with teeth of triangular form; and it consists in constructing the hoe in a novel manner, whereby several advantages are obtained, as hereinafter set forth.

A represents the back, B the shank, and C the ferrule, of our improved hoe. These parts are all cast in one piece and of malleable cast-iron.

The back A has a recess at its inner side, extending its whole length, to secure the teeth D, which may be of steel. The upper parts of these teeth are of rectangular form, and they fit snugly in the recess of the back side by side and in contact with each other, and are secured to the back by rivets $a$, as shown clearly in Fig. 3. The upper ends of the teeth D abut snugly against the top of the recess in the back, while the lower edge of the back abuts against a shoulder formed by a recess made in the outer sides of the teeth, so as to leave a flush, smooth, or unbroken surface at the outer side of the hoe.

The lower part of the teeth D are of triangular form, the teeth at one side being at right angles with the top edge of the back A, as shown at $b$, the opposite sides having an oblique position with the top edge of the back A, as shown at $b'$. (See Figs. 1 and 2.) The lower ends of the teeth have sharp points, and the teeth from the center of the hoe outward have at one side a reverse position to those at the other side, the oblique sides $b'$ of the teeth at both sides of the hoe facing the center of the same. This form of the teeth and the manner in which they are attached to the back A constitute a very important feature of the invention. A person in hoeing rarely strikes out in a direction at right angles with his body, but to the right and left obliquely downward, and by having the teeth arranged as shown they will, when thus brought in contact with the soil, readily penetrate it and not have a tendency to rebound, as would be the case were the teeth in the form of isosceles triangles and brought down obliquely to the earth.

By having the teeth attached to the back A, as shown, they may, when worn by use, be detached and replaced by new ones, and an individual tooth, when broken or injured, readily replaced by a new one when required.

The hoe may also be manufactured at a small cost, and will operate far more efficiently in cutting weeds and pulverizing the earth than the ordinary hoe.

In Figs. 4 and 5 a hoe, E, is shown provided with teeth F formed by cutting the blade. These teeth are pointed and are of isosceles triangular form, and will be found useful in those cases where the operator is at work in narrow spaces between rows of plants or vegetables and compelled to strike out at right angles with his body.

Having thus described our invention, we claim as new and desire to secure by Letters Patent—

1. A hoe composed of a back, A, shank B, and ferrule C, all cast in one piece, and with teeth D secured to the back A in the manner substantially as set forth.

2. Having the teeth D made in the form of a scalene triangle, with oblique side, and attached to the back A in reverse position from the center outward, so that the oblique sides will face the center of the hoe, as shown and described.

EDWIN RITSON.
WILLIAM W. BRIGG.

Witnesses:
HENRY VAN HYNING,
GIRSILLIA W. DENTON.